United States Patent
Lautenschläger et al.

(10) Patent No.: US 6,465,381 B1
(45) Date of Patent: Oct. 15, 2002

(54) ALKALI-FREE ALUMINOBOROSILICATE GLASS, ITS USE AND PROCESS FOR ITS PREPARATION

(75) Inventors: Gerhard Lautenschläger, Jena; Klaus Schneider, Apolda; Thomas Kloss, Jena; Andreas Sprenger, Mainz, all of (DE)

(73) Assignee: Schott Glas, Mainz (DE)

( * ) Notice: Subject to any disclaimer, the term of this patent is extended or adjusted under 35 U.S.C. 154(b) by 59 days.

(21) Appl. No.: 09/624,607

(22) Filed: Jul. 24, 2000

(30) Foreign Application Priority Data

Jul. 23, 1999 (DE) .......................................... 199 34 072

(51) Int. Cl.⁷ ........................... C03C 3/093; C03C 3/11; C03C 3/118
(52) U.S. Cl. ............................. 501/67; 501/56; 501/59; 501/70; 501/72; 501/27; 65/134.3
(58) Field of Search ............................. 501/56, 59, 67, 501/70, 72, 27; 65/134.3

(56) References Cited

U.S. PATENT DOCUMENTS 5,851,939 A * 12/1998 Miwa .......................... 501/70
6,060,168 A * 5/2000 Kohli .......................... 501/66
6,096,670 A 8/2000 Lautenschlaeger et al.
6,319,867 B1 * 11/2001 Chacon et al. ................ 501/66

FOREIGN PATENT DOCUMENTS

DE 196 01 922 7/1997
DE 197 39 912 12/1998
EP 0 901 990 3/1999

OTHER PUBLICATIONS

Derwent English Abstract of DE 196 01 922, Jul. 1997.
Derwent English Abstract of JP 09 048632 (Feb. 18, 1997).

* cited by examiner

Primary Examiner—David Sample
(74) Attorney, Agent, or Firm—Millen, White, Zelano & Branigan, P.C.

(57) ABSTRACT

The invention relates to an alkali-free aluminoboro-silicate glass which has the following composition (in % by weight, based on oxide): $SiO_2$ >60–65; $B_2O_3$ 6.5–9.5; $Al_2O_3$ 14–21; MgO 1–8; CaO 1–6; SrO 1–9; BaO 0.1–3.5; with MgO+CaO+SrO+BaO 8–16; $ZrO_2$ 0.1–1.5; $SnO_2$ 0.1–1; $TiO_2$ 0.1–1; $CeO_2$ 0.01–1. The glass is particularly suitable for use as a substrate glass in display technology.

27 Claims, No Drawings

ALKALI-FREE ALUMINOBOROSILICATE GLASS, ITS USE AND PROCESS FOR ITS PREPARATION

The invention relates an alkali-free aluminoboro-silicate glass, for example for use in display technology and other applications, and to a process for its preparation.

The basic requirements made on a glass which is to be used in display technology, for example as the front screen for a flat-panel display, have been described in detail by W. H. Dumbaugh, P. L. Bocko and F. P. Fehlner ("Glasses for flat-panel displays" in "High-Performance Glasses", ed. M. Cable and J. M. Parker, Blackie and Son Limited, Glasgow and London, 1992). The glasses currently available for TFT (thin film transistor) applications have also been reviewed in the article "Advanced glass substrates for flat panel displays" by J. C. Lapp, P. L. Bocko and J. W. Nelson, Corning Research 1994. The quality of the properties which are needed for flat glass substrates and have a decisive effect on the precision of the imaging properties of a system is dictated, on the one hand, directly by the composition of the glass and, on the other hand, by the production, processing and shaping methods and their ability to set particular properties for the glasses, for example thickness profile parameters and planarity parameters, the applicability of the methods being frequently limited in turn by the composition of the glass or by properties of the glass.

Borosilicate glasses play a dominant role in a large number of technically oriented glass applications. In particular, they are distinguished by high stability when subjected to cyclic and differential thermal loads, by low thermal expansion and by good resistance to corrosive reagents and media.

Borosilicate glasses are therefore in principle also of interest for use as substrate glass in display technology, but the display production process, for example for thin-film active matrix liquid crystal displays (TFT-AMLCDs), and the desired application require a very specific property profile of the glasses:

- a coefficient of thermal expansion $\alpha_{20/300}$ matched to polycrystalline silicon of from 3.0 to $3.8 \times 10^{-6}/K$; in particular an $\alpha_{20/300}$ of between 3.0 and $3.3 \times 10^{-6}/K$ means a good expansion match even up to temperatures of up to 700° C.
- a temperature at a viscosity of $10^{14.5}$ dPas of at least 680° C. in order to ensure high thermal processing and dimensional stability of the glass during production, in particular low compaction of the glass in the cooling phase,
- an alkali-free glass composition, a maximum alkali metal oxide content of $\Sigma R_2O=2000$ ppm being tolerable, in order to avoid poisoning the microstructured thin-film transistors by alkali metal ions diffusing into the semiconductor layer,
- a high high-temperature process stability documented by a transformation temperature Tg of between 710° C. and 780° C.,
- sufficient chemical, i.e. hydrolytic, acid and alkali resistance, with respect to the reagents and media used in the microstructuring process,
- a very low density, i.e. $\rho \leq 2.50$ g/cm$^3$, in order to keep the overall weight of the display low in view of the trend towards large screen formats.

Furthermore, the visual quality of the glass screens, that is to say the quality in terms of the absence of crystalline inclusions, knots and bubbles, must be very good.

This complex and extensive requirement profile is fulfilled best by borosilicate glasses from the alkaline earth metal aluminoborosilicate glass subfamily. The known commercially available glasses for TFT-AMLCD applications belong to this type of glass; the glasses in the patents or patent applications discussed below are also representatives of this group. However, all currently known glasses for display applications still have disadvantages and do not meet the full list of requirements.

U.S. Pat. No. 5,506,180 describes thermally stable and chemically resistant glasses, amongst other things for use as TFT display glass. On account of the high $B_2O_3$ contents of 10% or more and the relatively low $SiO_2$ levels (46–56%), glasses of this type are not sufficiently resistant to hydrochloric acid. Furthermore, their resistance to solutions containing hydrofluoric acid is only moderate. The matching of the thermal expansion to polycrystalline silicon is insufficient. The processing temperatures $V_A$ of less than 1150° C. are too low to make it possible to use drawing methods such as the microsheet down-draw method and the overflow fusion method as alternatives to the float process. Furthermore, the specified strain points of 642° C. or less are too low to ensure that there is little compaction.

European Patent EP 510 544 B1 describes alkali-free glasses which can be made by the float process and, amongst other things, are used as a substrate for a variety of displays and photographic masks. The glasses are free of BaO and MgO and have very low levels of $B_2O_3$. However, a disadvantage of these glasses is that their alkaline earth metal levels are high, with CaO levels being at least 10% by weight and SrO levels being at least 11% by weight. Their thermal expansion of $4.5-6.0 \times 10^{-6}/K$ is no longer sufficient to meet the requirements of high-quality TFT display glasses which are matched to polycrystalline silicon.

EP 527 320 B1 describes flat panel display devices having a strontium aluminosilicate glass substrate comprising at least 21 mol % of SrO. The glass compositions for glasses with high devitrification stability appear to be specifically designed to be suitable for being made in the overflow fusion draw method. The density of the glasses and their coefficient of thermal expansion are too high.

Japanese JP 8-295530 A describes alkali-free glass substrates whose stability with respect to hydrochloric acid will be low owing to the high $B_2O_3$ content (up to 15% by weight).

PCT application WO 97/11919 also describes alkali-free glass substrates. The glasses comprise relatively little $SiO_2$ and little or no MgO. They may contain up to 5% by weight each of ZnO and $TiO_2$. ZnO can cause glass defects owing to its tendency to evaporate from the glass surface in the float bath and subsequently condense. The possible high $TiO_2$ content will cause a brown tint in the glasses when conventional raw materials are used, since the $Fe^{3+}$ always present in the usual raw materials forms a brown colour complex with $Ti^{4+}$. The same applies to the glass substrates described in WO 97/11920.

European Patent Application EP 714 862 A1 describes alkali-free $ZrO_2$- and $TiO_2$-free glasses for use in TFT flat panel displays. Aluminosilicate glasses of this type having relatively high $SiO_2$ contents are highly viscous, making efficient refining extremely problematic. These glasses do not therefore meet the requisite high demands in terms of visual quality. EP 672 629 A2 or U.S. Pat. No. 5,508,237 describe aluminosilicate glasses for flat panel displays. They present a variety of composition ranges with different coefficients of thermal expansion. These glasses are allegedly processable not only by the overflow fusion draw method but also with other flat glass production methods. However, in particular the glasses which have a coefficient of thermal expansion matched to polycrystalline Si have very high processing temperatures $V_A$, which make them unsuitable for the float process. As in the case of the glasses described above, the visual quality here is not high, since no way of effective refining, in particular one compatible with the float process, is presented. The refining agents $Sb_2O$, and $As_2O_3$ mentioned by way of example are unsuitable for the float process because they can be reduced readily. The same is true for the optional glass components $Ta_2O_5$ and $Nb_2O_5$.

In the alkali-free glass substrates for TFT-AMLCD from JP 9-48632 A, the visual quality will likewise not be high, since merely $SiO_2$, $B_2O_3$, MgO and BaO have to be present in the glass.

German Patent DE 38 08 573 C2 describes alkali-free SrO- and $B_2O_3$-free aluminosilicate glasses which contain $SnO_2$, are easy to melt and can be refined at low cost. The glasses exhibit high chemical stability. They are used as photographic mask glass. At $4.0 \times 10^{-6}$/K, their thermal expansion behaviour is not optimally matched to that of polycrystalline Si. On account of the fact that they are free of $B_2O_3$, the glasses have a temperature/viscosity profile which is unfavourable for flat glass production processes.

German Patent DE 196 17 344 C1 in the name of the applicant company also describes alkali-free glasses which contain $SnO_2$. The glasses have a relatively low $SiO_2$ level and are free of $TiO_2$. With a coefficient of thermal expansion of about $3.7 \times 10^{-6}$/K and very good chemical stability, these glasses are suitable for use in display technology. There is, however, still a need for improvement in terms of making them economically manufacturable with the float method as well as the draw method, that is to say in terms of being "universally" manufacturable and in terms of lowering the thermal expansion and the density as is desired. This is also true as regards the $TiO_2$- and SrO-free glasses described in German Patent DE 196 036 98 C1 in the name of the applicant company.

Alkali-free aluminoborosilicate glasses which have relatively low $SiO_2$ contents and are very suitable as substrate glasses for current TFT displays have already been described in another German patent in the name of the applicant company, DE 197 39 912 C1. A need for improvement only exists in terms of the low density requirements which will increase in future owing to the increasing screen format sizes, and in terms of a very exact expansion match to polycrystalline silicon.

WO 97/30001 describes substrates for solar cells and TFTs. The substrates consist of glasses or glass ceramics which are based on an aluminosilicate glass and have a thermal stability of at least 700° C. Their constituents and composition ranges may vary within wide limits and correspondingly vary in terms of their properties. The glasses may contain $Cs_2O$. On account of the fact that they are free of $B_2O_3$, the glasses will have relatively high densities and an inadequate crystallization stability.

WO 98/27019 describes substrates for flat panel displays and photovoltaic devices. The substrates are comprised of glasses exhibiting a coefficient of thermal expansion $\alpha_{20/300}$ of between 3.0 and $4.0 \times 10^{-6}$/K and a temperature at $10^{14.5}$ dPas of more than 600° C. and which consist of $SiO_2$, $Al_2O_3$, $B_2O_3$ and alkaline earth metal oxid(es) (10–25% by weight of RO), where of these ROs only CaO has to be present and SrO+BaO is between 0 und 3% by weight. However, such an unbalanced ratio of small cations to large cations of the alkaline earth metals results in poor devitrification stability.

German Offenlegungsschrift DE 196 01 922 A1 describes alkali-free glasses which contain SnO and have a rather high $B_2O_3$ content and alkaline earth metal levels which may vary within wide limits.

JP 9-263 421 A and JP 10-454 22 A describe alkali-free glasses which can be processed by the float method for use as substrates in flat-panel display systems. The glasses listed have rather high temperatures at a viscosity of $10^2$ dPas, which signifies poor meltability and makes low-cost production impossible, since the requisite temperature range also means that very high requirements are made of the tank and distributor material with respect to corrosion resistance. The glasses of JP 10-454 22 A are free of $TiO_2$, $ZrO_2$ and $CeO_2$. The density of the BaO-containing glasses is relatively high at $\rho > 2.6$ g/cm$^3$. The glasses of JP 9-263 421 A preferably contain no BaO and are free of $TiO_2$, $ZrO_2$, $CeO_2$ and $SnO_2$.

Alkali-free glasses for use as substrate glass in displays are also described in JP 10-130034 A, JP 10-114538 and JP 10-59741 A. However, their constituents and composition ranges may vary within wide limits and correspondingly vary in terms of their properties. All the glasses may contain up to 10% by weight of ZnO which is unfavourable for production by the float process.

The glasses described in JP 10-130034 A contain at least 0.05% by weight of $As_2O_3$ and 0.05% by weight of $SnO_2$. Owing to their $As_2O_3$ content, they cannot be made by the float process. Owing to the very low $SiO_2$ contents (only about 55% by weight) of some of the exemplary glasses, the HCl resistance does not meet the requirements of flat glass and photovoltaics substrates.

JP 10-114538 A replaces the $As_2O_3$ refinement of JP 10-130034 A with an $Sb_2O_2$ refinement, and as a result the $Sb_2O_3$ content is between 0.05 and 3% by weight which likewise rules out production by the float process. JP 10-59741 A uses 0.05–2.0% by weight of $SnO_2$ as the sole refining agent. This document does not mention any additions and/or components which stabilize the tetravalent tin dioxide until the refining. temperature is reached and prevent premature generation of oxygen. As a result, the glasses will not exhibit the high visual quality (freedom from bubbles) required for display applications.

It is an object of the present invention to provide glasses which meet the said physical and chemical requirements of glasses for substrates for TFT displays, for MEMS (microengineering and -mechanical systems), for wafer-bondable insulators (SOT, silicon on insulator) and for thin film solar cells, glasses which have a favourable processing temperature range and high devitrification. stability, so that a variety of flat glass manufacturing methods, such as the float method or draw method can be employed for producing them, depending on the specific requirement profile for the substrat types mentioned. The thicknesses which can be produced therefore also vary in the range between 30 $\mu$m and a few mm. Glasses of this type need to be readily meltable and refinable.

The formation of highly volatile borate compounds such as zinc borate, lead borate and barium aluminoborate, which can impair the internal glass quality, should be avoided or at least minimized.

In order to produce microsheets in the thickness range between 30 and 50 $\mu$m using the microsheet down-draw method (MDD method), the glasses should at the same time have very high devitrification stability and specific processing temperatures $V_A$:

Suitable processing temperatures are temperatures at a viscosity of $10^4$ dPas of preferably 1260 to 1320° C. One characteristic for the devitrification stability or crystallization stability is the maximum crystal growth rate $v_{MAX}$

[µm/h]. It indicates the largest observed growth length of the crystals which are formed: on a plot of the growth rate v of the crystals against temperature T, $v_{MAX}$ corresponds to the growth rate at the temperature of maximum crystal growth, at $KG_{MAX}$. The smaller $v_{MAX}$, the less crystalline volume is formed. This $v_{MAX}$ should in this case be no more than 10 µm/h.

In order to produce glass panels for display applications using the microfloat method, in particular in large formats, the temperature at $10^4$ dPas viscosity should preferably be between 1250 and 1350° C. Readily reducible glass components such as $As_2O_3$, $Sb_2O_3$, $P_2O_5$, $Bi_2O_3$, $Nb_2O_5$, $Ta_2O_5$, PbO, CdO and ZnO should not be contained in the glass composition, because they can be reduced to the elementary state under the reducing conditions in the float bath, and can produce a grey metallic surface reflection or other microsurface defects. The requirements of crystallization stability are not as high here as in the aforementioned MDD method. A via of less than or equal to 30 µm/h is therefore still sufficient.

The aforementioned object is achieved by a glass according to Patent claim 1 and by a process according to Patent claim 7.

According to the invention, the three glass-forming components $SiO_2$, $B_2O_3$ and $Al_2O_3$ are present in narrowly defined contents, and thus within a narrow ratio relative to one another as well: the $B_2O_3$ content is rather low and is at least 6.5% by weight and at most 9.5% by weight. Limitation to less than 9% by weight is preferred. A $B_2O_3$ content of between 7 and 8.5% by weight is particularly preferred. The $Al_2O_3$ content can vary between 14 and 21% by weight. A content of at least 15% by weight and at most 20% by weight is preferred. A content of at least 15.5% by weight and at most 19.5% by weight is particularly preferred. Surprisingly, the $SiO_2$ content can be relatively high, i.e. >60–65% by weight, without any disadvantages in terms of viscosity in the melting range. As a result, the chemical resistance (for example to 5% strength HCl) is significantly improved and a low density can be ensured at the same time. Even higher levels would lead to an excessive increase in the viscosity in the melting range. A level of at least 60.5% by weight is preferred, a content of at most 62.5% by weight is particularly preferred. In this way it is possible to achieve the desired low coefficients of thermal expansion $\alpha_{20/300}$ in the range of from 3.0 to $3.8 \times 10^{-6}$/K with at the same time a low density p of at most 2.50 g/cm$_3$. The particularly preferred range of $\alpha_{20/300}=3.0–3.3 \times 10^{-6}$/K is achieved by a high $Al_2O_3$ content of at least 18.0% by weight at an SiO. content of at least 60.5% by weight. On account of the mutual influence of $B_2O_3$ and $Al_2O_3$ in the glass structure, the desired good chemical and crystallization stability can only be achieved in the aforementioned narrow range of $B_2O_3$ content. Lower $B_2O_3$ contents make the glass more susceptible to devitrification and increase the thermal expansion by directly affecting the Al coordination, with the number of aluminium atoms with coordination numbers 5 and 6 increasing, If the $B_2O_3$ and $Al_2O_3$ content is too high, the resistance to hydrochloric acid is reduced.

The glass of the invention contains a relatively low amount of alkaline-earth metal oxides. This results in a low density, a high strain point and a low thermal expansion. They are present in the glass at a total of at least 8% by weight. At an even lower level, the temperatures at the viscosities required for melting and shaping would be too high. A balanced ratio between small cations and large cations of the alkaline-earth metal oxides has a positive effect on the processing temperature and on the devitrification stability. The glass therefore contains 1–8% by weight of MgO and 1–6% by weight of CaO and 0.1–3.5% by weight of BaO and 1–9% by weight of SrO. The total level of MgO, CaO, SrO and BaO should in this case remain restricted to a maximum of 16% by weight, since otherwise the chemical resistance again decreases.

The use of SrO is preferred over BaO in order to keep the density of the glasses low. If the heavy oxides BaO and SrO were fully eliminated, or if their level were too low, then the glass would become more susceptible to devitrification and the tranformation temperature as well as the temperature at a viscosity of $10^{14.5}$ dPas would decrease. At excessively high levels of BaO and SrO, the processing temperature would become unacceptably high. Glasses which are low in BaO are preferably processed by the float method, while glasses containing a higher level of BaO are preferably processed by the draw method because of their better crystallization stability. Preference is given to an alkaline earth metal content ($\Sigma RO=MgO+CaO+SrO+BaO$) of between 9 and <15% by weight, where the individual oxides should be present at the following levels: MgO 1–7% by weight; CaO 1–5% by weight; SrO 2–8% by weight; BaO 0.5–3% by weight. Particular preference is given to 3–5% by weight of MgO, 2–5% by weight of CaO, 3–7% by weight of SrO and 0.6–<3, very particularly preferred up to 1.5% by weight of BaO, at 10–14% by weight of RO. Apart from unavoidable impurities, the glass is free of ZnO and alkali metal oxides. On account of the special content of large cations ($Ba^{2+}$, $Sr^{2+}$) in the borosilicate base glass at relatively high $Al_2O_3$ contents, the galsses of the invention exhibit a low thermal expansion and very favourable viscosity/temperature profiles, i.e. a steep viscosity profile in the transformation range and a flatter viscosity increase in the processing range.

The glass furthermore contains 0.1–1.5% by weight of $ZrO_2$. $ZrO_2$ improves chemical resistance. A minimum content of 0.2% by weight is preferred. The maximum $ZrO_2$ content is limited by its low solubility and is preferably 1% by weight, particularly preferably 0.6% by weight. The glass also contains 0.1–1% by weight of $TiO_2$. This minimizes the otherwise often observed susceptibility of aluminoborosilicate glasses to solarization, that is to say reduction in transmission in visible wavelengths because of UV-VIS radiation. The $TiO_2$ content is preferably at most 0.5% by weight, particularly preferably at least 0.2% by weight and at most 0.4% by weight.

Furthermore, the glass contains tin oxide which is present in the glass in the redox equilibrium $SnO_2/SnO$ and acts as a refining agent, in an amount of 0.1–1.0% by weight, calculated and used as $SnO_2$. Preference is given to a content of at least 0.2% by weight and at most 0.8% by weight, particularly preferably at most 0.6% by weight.

Besides the aforementioned $SnO_2$ content, the presence of 0.01–1.0% by weight of $CeO_2$ is essential to the invention: By the combination of $SnO_2$ with $CeO_2$, the $SnO_2/SnO$ redox equilibrium is stabilized and a refining effect is achieved which is exceptionally good for aluminoborosilicate glasses, so that the glasses according to the invention exhibit the requisite high visual quality. Furthermore, $SnO_2$ and $CeO_2$ in combination with $ZrO_2$ stabilize the chemical resistance of the glasses. However, at higher $CeO_2$ contents, the UV-absorption increases and the absorption cut-off shifts into the VIS range, resulting in the occurrence of a distinct yellow tint in the glass. At the same time, the glasses exhibit a notable fluorescence. A content of at most 0.5% by weight is therefore preferred.

This relatively low $CeO_2$ content is made possible by the addition of nitrate which sufficiently stabilizes the $SnO_2$/SnO redox equilibrium.

According to the invention, $NH_4NO_3$ is added to the batch in amounts of between 0.2 and 3% by weight. The strong oxidizing effect of $NH_4NO_3$ stabilizes the refining agent combination $SnO_2$/$CeO_2$ in the melting region in its tetravalent form so that a premature oxygen release is avoided.

As a result, a significantly higher proportion of tetravalent $SnO_2$ and $CeO_2$ is availabe for decomposition into SnO and $Ce_2O_3$ with release of oxygen (=refining) on reaching the refining temperature, so that an exceptionally good visual quality of the glasses was observed.

Preference is given to adding at least 0.5% by weight of $NH_4NO_3$, particularly preferably at least at least 1.0% by weight.

By the addition of $NH_4NO_3$, other polyvalent ions in the glass melt can be oxidized at the same time. For instance, the very good transmission of the glasses is, amongst other things, a result of the oxidation of $Fe^{2+}$ to $Fe^{3+}$ which causes much less colouration in the glass than its divalent form. $NH_4NO_3$ completely decomposes at these high temperatures so that the glass properties are not impaired by any residues.

Amongst other things, because it is thus possible to eliminate the use of the refining agents arsenic oxide and antimony oxide, and the glasses are free both of these components and of the other readily reducible constituents lead oxide, cadmium oxide, zinc oxide, bismuth oxide, niobium oxide, tantalum oxide and phosphorus oxide, apart from unavoidable impurities, these glasses can be processed not only using a variety of draw methods, but also by the float method. If the latter method is not to be employed, the glass may contain up to 1.5% by weight of $As_2O_3$ and/or $Sb_2O_3$ as additional refining agent(s) under nonreducing conditions, for example in the down-draw process. It is also possible to add 1.5% by weight each of $Cl^-$ (for example in the form of $BaCl_2$ or $NH_4Cl$), $F^-$ (for example in the form of $CaF_2$) or $SO_4^{2-}$ (for example in the form of $BaSO_4$). The sum of $As_2O_3$, $Sb_2O_3$, $Cl^-$, $F^-$ and $SO_4^{2-}$ should, however, not exceed 1.5% by weight. By $NH_4Cl$ addition, it is possible to reduce the water content of the melt even when relatively water-rich raw materials (such as $Al(OH)_3$ or $Mg(OH)_2$, which in turn improve the melting behaviour) are used, avoiding reboil problems during settling and conditioning of the refined glass and making it easier to achieve the desired high visual glass quality (bubbles, inclusions etc.).

Illustrative Embodiments

Glasses were melted in quartz glass crucibles from conventional raw materials at 1640° C., the melt was refined for one and a half hours at this temperature, then poured into inductively heated platinum crucibles and stirred for 30 minutes at 1550° C. to homogenize it.

The tables show glasses according to the invention with their compositions and their most important properties in examples 1 to 11 (Table 1), and the glasses not according to the invention in comparative examples A to M (Table 2). The various chemical resistances are given as follows: Glass plates measuring 70 mm×50 mm×2 mm and polished on all sides were treated for the indicated period of time at the indicated temperature with the respective solution, and the weight loss (material removal value) was determined and indicated in $mg/cm^2$.

| | |
|---|---|
| $H_2O$ | Treatment with water for 24 hours at 95° C. |
| HCl | Treatment with 5% strength hydrochloric acid for 24 hours at 95° C. |
| NaOH | Treatment with 5% srength sodium hydroxide solution for 6 hours at 95° C. |
| "BHF" | Treatment with 10% strength hydrofluoric acid solution for 20 minutes at 20° C. |

The characteristics indicated for the susceptibility to crystallization (susceptibility to devitrification), or crystallization stability are the liquidus temperature LT [° C.] and the maximum crystal growth rate $v_{MAX}$ [μm/h]. The temperatures for viscosities $10^{14.5}$ dPas, $10^{13}$ dPas, $10^{7.6}$ dPas and $10^4$ dPas are denoted in the Tables by T 14.5; T 13; T 7.6 and T 4.

Further properties of the glasses which are indicated are the transformation temperature Tg [° C.], coefficient of thermal expansion $\alpha_{20/300}$ [$10^{-6}$/K] and density $\rho$ [$g/cm^3$].

TABLE 1

Examples: Compositions (in % by weight, based on oxide) and essential properties of glasses according to the invention.

| | 1 | 2 | 3 | 4 |
|---|---|---|---|---|
| $SiO_2$ | 61.0 | 62.0 | 62.0 | 62.0 |
| $B_2O_3$ | 8.0 | 8.0 | 8.0 | 8.0 |
| $Al_2O_3$ | 15.0 | 16.0 | 15.0 | 17.0 |
| MgO | 4.0 | 2.0 | 3.0 | 2.0 |
| CaO | 2.0 | 2.0 | 2.0 | 2.0 |
| SrO | 6.0 | 6.0 | 6.0 | 5.0 |
| BaO | 2.3 | 2.3 | 2.3 | 2.3 |
| $ZrO_2$ | 0.5 | 0.5 | 0.5 | 0.5 |
| $SnO_2$ | 0.5 | 0.5 | 0.5 | 0.5 |
| $TiO_2$ | 0.5 | 0.5 | 0.5 | 0.5 |
| $CeO_2$ | 0.2 | 0.2 | 0.2 | 0.2 |
| $\rho$ [$g/cm^3$] | 2.49 | 2.49 | 2.48 | 2.47 |
| $\alpha_{20/300}$ [$10^{-6}$/K] | 3.47 | 3.39 | 3.34 | 3.25 |
| Tg [° C.] | 712 | 720 | 730 | 735 |
| T 4 [° C.] | 1303 | 1338 | 1346 | 1339 |
| T 7.6 [° C.] | 964 | 985 | 990 | 991 |
| T 13 [° C.] | 739 | 739 | 744 | 742 |
| T 14.5 [° C.] | 701 | 699 | 702 | 701 |
| LT [° C.] | 1150 | 1150 | 1100 | 1170 |
| $v_{max}$ [μm/h] | 6.9 | 6.2 | 4.0 | 9.5 |
| $H_2O$ [$mg/cm^2$] | <0.1 | <0.1 | <0.1 | <0.1 |
| HCl [$mg/cm^2$] | 0.5 | 0.45 | 0.49 | 0.38 |
| NaOH [$mg/cm^2$] | 1.38 | 1.36 | 1.35 | 1.35 |
| "BHF" [$mg/cm^2$] | 0.46 | 0.40 | 0.42 | 0.30 |

| | 5 | 6 | 7 | 8 |
|---|---|---|---|---|
| $SiO_2$ | 62.0 | 62.0 | 61.0 | 62.0 |
| $B_2O_3$ | 8.0 | 8.0 | 8.0 | 8.0 |
| $Al_2O_3$ | 18.0 | 19.0 | 15.0 | 16.0 |
| MgO | 2.0 | 2.0 | 4.0 | 2.0 |
| CaO | 2.0 | 2.0 | 5.0 | 4.0 |
| SrO | 5.0 | 5.0 | 4.5 | 5.0 |
| BaO | 1.3 | 0.3 | 0.8 | 1.3 |
| $ZrO_2$ | 0.5 | 0.5 | 0.5 | 0.5 |
| $SnO_2$ | 0.5 | 0.5 | 0.5 | 0.5 |
| $TiO_2$ | 0.5 | 0.5 | 0.5 | 0.5 |
| $CeO_2$ | 0.2 | 0.2 | 0.2 | 0.2 |
| $\rho$ [$g/cm^3$] | 2.46 | 2.450 | 2.490 | 2.470 |
| $\alpha_{20/300}$ [$10^{-6}$/K] | 3.20 | 3.10 | 3.60 | 3.38 |
| Tg [° C.] | 740 | 746 | 710 | 724 |
| T 4 [° C.] | 1345 | 1335 | 1280 | 1327 |
| T 7.6 [° C.] | 993 | 1005 | 948 | 975 |
| T 13 [° C.] | 745 | 751 | 728 | 738 |
| T 14.5 [° C.] | 702 | 705 | 691 | 697 |
| LT [° C.] | 1170 | n.d. | 1170 | 1170 |

TABLE 1-continued

Examples: Compositions (in % by weight, based on oxide) and essential properties of glasses according to the invention.

| | | | | |
|---|---|---|---|---|
| $v_{max}$ [μm/h] | n.d. | 7.1 | 10.0 | 4.0 |
| $H_2O$ [mg/cm$^2$] | <0.1 | <0.1 | <0.1 | <0.1 |
| HCl [mg/cm$^2$] | 0.36 | 0.20 | 0.43 | 0.45 |
| NaOH [mg/cm$^2$] | 1.28 | 1.32 | 1.35 | 1.05 |
| "BHF" [mg/cm$^2$] | 0.37 | 0.30 | 0.30 | 0.40 |

| | 9 | 10 | 11 | 12 |
|---|---|---|---|---|
| $SiO_2$ | 62.0 | 62.0 | 61.5 | 62.0 |
| $B_2O_3$ | 8.0 | 7.2 | 7.5 | 8.1 |
| $Al_2O_3$ | 16.0 | 14.5 | 18.5 | 15.5 |
| MgO | 2.0 | 3.0 | 3.0 | 3.0 |
| CaO | 5.0 | 4.6 | 2.0 | 5.5 |
| SrO | 4.5 | 4.0 | 5.0 | 4.0 |
| BaO | 0.8 | 3.0 | 0.8 | 0.8 |
| $ZrO_2$ | 0.5 | 0.5 | 0.5 | 0.2 |
| $SnO_2$ | 0.5 | 0.5 | 0.5 | 0.5 |
| $TiO_2$ | 0.5 | 0.5 | 0.5 | 0.2 |
| $CeO_2$ | 0.2 | 0.2 | 0.2 | 0.2 |
| ρ [g/cm$^3$] | 2.460 | 2.500 | 2.490 | 2.490 |
| $α_{20/300}$ [10$^{-6}$/K] | 3.44 | 3.61 | 3.08 | 3.60 |
| Tg [° C.] | 725 | 712 | 748 | 710 |
| T 4 [° C.] | 1322 | 1307 | 1315 | 1290 |
| T 7.6 [° C.] | 967 | 959 | 995 | 960 |
| T 13 [° C.] | 734 | 728 | 745 | 725 |
| T 14.5 [° C.] | 683 | 689 | 692 | 688 |
| LT [° C.] | 1170 | 1170 | 1170 | 1150 |
| $v_{max}$ [μm/h] | 4.7 | 9.0 | 8.2 | 5.0 |
| $H_2O$ [mg/cm$^2$] | <0.1 | <0.1 | <0.1 | <0.1 |
| HCl [mg/cm$^2$] | 0.48 | 0.35 | 0.15 | 0.45 |
| NaOH [mg/cm$^2$] | 1.35 | 1.22 | 1.1 | 1.12 |
| "BHF" [mg/cm$^2$] | 0.40 | 0.32 | 0.6 | 0.66 |

TABLE 2

Comparative examples: Compositions (in % by weight, based on oxide) and essential properties of glasses not according to the invention.

| | A | B | C | D | E |
|---|---|---|---|---|---|
| $SiO_2$ | 57.0 | 55.8 | 59.0 | 59.5 | 59.5 |
| $B_2O_3$ | 5.0 | 10.0 | 5.0 | 5.0 | 5.0 |
| $Al_2O_3$ | 18.0 | 18.0 | 15.0 | 15.0 | 15.0 |
| MgO | 8.0 | 5.0 | 2.0 | 10.0 | 5.0 |
| CaO | 2.0 | 2.0 | 10.0 | 2.0 | 7.0 |
| BaO | 6.0 | 2.0 | 5.0 | 1.0 | 1.0 |
| SrO | 3.0 | 6.0 | 3.0 | 5.5 | 5.5 |
| $ZrO_2$ | — | 0.5 | — | 1.0 | 1.0 |
| $SnO_2$ | 1.0 | 0.5 | 1.0 | 1.0 | 1.0 |
| $TiO_2$ | — | — | — | — | — |
| $CeO_2$ | — | 0.2 | — | — | — |
| ρ [g/cm$^3$] | 2.61 | 2.54 | 2.61 | 2.59 | 2.59 |
| $α_{20/300}$ [10$^{-6}$/K] | 4.0 | 3.6 | 4.5 | 4.0 | 4.2 |
| Tg [° C.] | 738 | 717 | 726 | 736 | 722 |
| T 4 [° C.] | | 1254 | | | 1230 |
| T 7.6 [° C.] | | 942 | | | |
| T 13 [° C.] | | 729 | | | |
| T 14.5 [° C.] | | 670 | | | |
| LT [° C.] | >1250 | 1150 | >1250 | >1250 | >1250 |
| $v_{max}$ [μm/h] | 51 | 4.4 | 28 | 40 | 38 |
| $H_2O$ [mg/cm$^2$] | 0.02 | 0.02 | 0.02 | 0.02 | 0.02 |
| HCl [mg/cm$^2$] | 0.3 | 2.3 | 0.2 | 0.2 | 0.2 |
| NaOH [mg/cm$^2$] | 0.6 | 1.1 | 0.7 | 0.7 | 0.7 |
| "BHF" [mg/cm$^2$] | 0.1 | 0.7 | 0.1 | 0.1 | 0.1 |

TABLE 2-continued

Comparative examples: Compositions (in % by weight, based on oxide) and essential properties of glasses not according to the invention.

| | F | G | H | I |
|---|---|---|---|---|
| $SiO_2$ | 59.5 | 59.5 | 58.0 | 59.8 |
| $B_2O_3$ | 5.0 | 5.0 | 4.0 | 9.3 |
| $Al_2O_3$ | 15.0 | 15.0 | 18.0 | 14.5 |
| MgO | 5.0 | 6.0 | 6.0 | 2.0 |
| CaO | 7.0 | 8.0 | 8.0 | 2.0 |
| BaO | 3.0 | 2.0 | 2.0 | 7.0 |
| SrO | 3.5 | 2.5 | 2.0 | 4.0 |
| $ZrO_2$ | 1.0 | 1.0 | 1.0 | 0.5 |
| $SnO_2$ | 1.0 | 1.0 | 1.0 | 0.2 |
| $TiO_2$ | — | — | — | 0.5 |
| $CeO_2$ | — | — | — | 0.2 |
| ρ [g/cm$^3$] | 2.59 | 2.58 | 2.60 | 2.53 |
| $α_{20/300}$ [10$^{-6}$/K] | 4.2 | 4.1 | 4.1 | 3.6 |
| Tg [° C.] | 724 | 727 | 735 | 704 |
| T 4 [° C.] | 1234 | 1215 | 1224 | 1316 |
| T 7.6 [° C.] | | 915 | 921 | 959 |
| T 13 [° C.] | | 716 | 710 | 714 |
| T 14.5 [° C.] | | 665 | 661 | 660 |
| LT [° C.] | >1250 | >1250 | >1250 | 1150 |
| $v_{max}$ [μm/h] | 35 | 50 | 62 | 4.4 |
| $H_2O$ [mg/cm$^2$] | 0.02 | 0.02 | 0.02 | 0.01 |
| HCl [mg/cm$^2$] | 0.2 | 0.2 | 0.1 | 0.4 |
| NaOH [mg/cm$^2$] | 0.7 | 0.6 | 0.5 | 1.2 |
| "BHF" [mg/cm$^2$] | 0.1 | 0.1 | 0.1 | 0.5 |

| | J | K | L | M |
|---|---|---|---|---|
| $SiO_2$ | 59.0 | 65.0 | 58.0 | 59.5 |
| $B_2O_3$ | — | — | — | 8.0 |
| $Al_2O_3$ | 17.0 | 21.0 | 17.0 | 15.0 |
| MgO | 7.0 | 8.0 | 9.0 | 6.0 |
| CaO | 6.5 | — | 4.0 | 2.0 |
| BaO | 2.5 | 7.0 | 3.5 | 2.3 |
| SrO | — | — | 7.0 | 6.0 |
| $ZrO_2$ | 8.0 | — | — | 0.5 |
| $SnO_2$ | — | — | 0.5 | 0.5 |
| $TiO_2$ | — | — | 0.5 | 0.5 |
| $CeO_2$ | — | — | 0.5 | 0.2 |
| ρ [g/cm$^3$] | 2.72 | 2.56 | 2.72 | 2.54 |
| $α_{20/300}$ [10$^{-6}$/K] | 3.90 | 3.15 | 4.3 | 3.7 |
| Tg [° C.] | 738 | 822 | 760 | 708 |
| T 4 [° C.] | 1230 | >1400 | n.d. | 1252 |
| T 7.6 [° C.] | 944 | n.d. | n.d. | 936 |
| T 13 [° C.] | 754 | n.d. | n.d. | 724 |
| T 14.5 [° C.] | n.d. | n.d. | n.d. | 666 |
| LT [° C.] | n.d. | >1300 | n.d. | 1210 |
| $v_{max}$ [μm/h] | 5.3 | >1000 | n.d. | 7.3 |
| $H_2O$ [mg/cm$^2$] | <0.1 | n.d. | n.d. | 0.01 |
| HCl [mg/cm$^2$] | 0.8 | n.d. | n.d. | 0.8 |
| NaOH [mg/cm$^2$] | 0.9 | n.d. | n.d. | 1.0 |
| "BHF" [mg/cm$^2$] | 0.3 | n.d. | n.d. | 0.6 |

Furthermore, the efficiency of the refinement of the melts, i.e. the visual quality of the glass, was evaluated by counting the bubbles present in the cooled glass. The symbols in Table 3 have the following meanings:

xx number of bubbles>500 per kg of glass x number of bubbles>100–500 per kg of glass +/− number of bubbles 50–100 per kg of glass + number of bubbles<50 per kg of glass Table 3 demonstrates that the $NH_4NO_3$ addition to the batch in the production process according to the invention which comprises the otherwise customary process steps of batch preparation, melting, refining, homogenizing, hot shaping, i.e. processing by e.g. draw or float methods, has a beneficial influence on the visual quality of the glasses.

TABLE 3

Visual quality of the glasses (examples 1–12 with addition of $NH_4NO_3$ and in some cases also addition of $NH_4Cl$ to the batch, comparative examples A–M) (for compositions, see Tables 1 and 2).

| % by weight | 1 | 2 | 3 | 4 | 5 | 6 |
|---|---|---|---|---|---|---|
| $NH_4NO_3$ | 0.2 | 0.5 | 1.0 | 1.0 | 1.5 | 1.5 |
| $NH_4Cl$ | – | 0.2 | – | – | – | 0.5 |
| Visual quality | + | + | + | + | + | + |
| % by weight | 7 | 8 | 9 | 10 | 11 | 12 |
| $NH_4NO_3$ | 0.5 | 0.5 | 2.0 | 2.0 | 2.0 | 2.0 |
| $NH_4Cl$ | 0.5 | 1.0 | 1.5 | – | 0.5 | – |
| Visual quality | + | + | + | + | + | + |
| % by weight | A | B | C | D | E | F |
| $NH_4NO_3$ | – | – | – | – | – | – |
| $NH_4Cl$ | – | – | – | – | – | – |
| Visual quality | x | +/– | x | x | x | x |
| % by weight | G | H | I | J | K | L | M |
| $NH_4NO_3$ | – | – | – | – | – | | – |
| $NH_4Cl$ | – | – | – | – | – | | – |
| Visual quality | x | x | +/– | xx | xx | +/– | +/– |

The glasses from the comparative examples each have some very good individual properties as well, but unlike the glasses according to the invention, none of the comparison glasses meets the entire requirement profile of a display substrate glass for TFT applications: $B_2O_3$ levels which are too low reduce the devitrification stability and increase the thermal expansion (examples A, C–H). Too high a $B_2O_3$ content reduces the resistance to hydrochloric acid (example B). Example I illustrates the need for a balanced ratio of small alkaline-earth metal ions to large ones: with a "correct" total amount of alkaline-earth metal oxides, but too much BaO, the processing temperature is very high. $B_2O_3$-free comparative examples J, K and L either exhibit a very poor devitrification stability or are not sufficiently well matched to polycrystalline silicon in terms of their thermal expansion. Comparative example M, whose $SiO_2$ content is too low (as in A–J and L) and whose RO content is too high (as in A, C–H and L), has too high a density, which is also the case with the other examples. In addition, Tg and T 14.5 are not sufficiently high to meet the high requirements of the glasses.

Conversely, the glasses according to the invention, exhibiting a narrowly defined composition range, combine together all the properties which have been discussed:

Their coefficient of thermal expansion ($\alpha_{20/300}$ of between 3.0 and $3.8 \times 10^{-6}$/K) is very well matched to polycrystalline silicon.

a Their density is very low (g<2.50 g/cm³).

Their chemical resistances are excellent (e.g. weight loss of at most 1.0 Mg/Cm² after treatment in 5% strength hydrochloric acid at 95° C. for 24 hours).

They have sufficient solarization stability.

They have favourable processing temperatures (temperature at a viscosity of $10^4$ dPas of between 1280° C. and 1350° C.).

The temperature at a viscosity of $10^{14.5}$ dPas is at least 680° C.

The transformation temperature Tg is between 710° C. and 780° C.

The glasses are alkali-free.

The glasses have very good crystallization stability.

Owing to their temperature/viscosity profile and their low susceptibility to crystallization, the glasses may, as long as they are free of readily reducible constituents, be processed both using the various draw methods and using the float method. It should, however, be understood that, owing to its very specific property profile, one specific glass from the composition range according to the invention is even more suitable for one method than for the other. On the basis of the indications given here, the person skilled in the art can easily select the glass which is optimum for the relevant application and special needs.

Owing to their balanced combination of constituents, in particular refining agents, whose effect can be increased by adding $NH_4NO_3$ and/or $NH_4Cl$, the glasses have very good visual quality. At the same time the water content of the glass can be controlled by means of the level of added $NH_4Cl$.

The addition of the strong oxidizing agent $NH_4NO_3$ at the same time stabilizes the trivalent form of the iron ion in the glass which leads to an increase in transmission.

Sheets produced from the glasses exhibit a high quality in terms of warp, waviness, roughness, planarity and in-plate thickness variation.

Owing to this property profile, the glasses according to the invention are highly suitable for use as substrate glasses in display technology, in particular in TFT display technology, and in thin-film photovoltaics and for MEMS and SOI.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 19934072.2, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Alkali-free aluminoborosilicate glass, which has the following composition (in % by weight, based on oxide):

| | |
|---|---|
| $SiO_2$ | 60.5–65 |
| $B_2O_3$ | 6.5–9.5 |
| $Al_2O_3$ | 14–21 |
| MgO | 1–8 |
| CaO | 1–6 |
| SrO | 1–9 |
| BaO | 0.1–3.5 |
| with MgO + CaO + SrO + BaO | 8–16 |
| $ZrO_2$ | 0.1–1.5 |
| $SnO_2$ | 0.1–1 |
| $TiO_2$ | 0.1–1 |
| $CeO_2$ | 0.01–1. |

2. Aluminoborosilicate glass according to claim 1, characterized by the following composition (in % by weight, based on oxide):

| | |
|---|---|
| $SiO_2$ | 60.5–65.0 |
| $B_2O_3$ | 6.5–9.0 |
| $Al_2O_3$ | 15–20 |
| MgO | 1–7 |
| CaO | 1–5 |
| SrO | 2–8 |
| BaO | 0.5–3 |
| with MgO + CaO + SrO + BaO | 9–15 |
| $ZrO_2$ | 0.2–1 |
| $SnO_2$ | 0.2–0.8 |
| $TiO_2$ | 0.1–0.5 |
| $CeO_2$ | 0.01–0.5. |

3. An alkali-free aluminoborosilicate glass according to claim 2, wherein the $SiO_2$ weight percent, based on oxide, is over 60.5% to 65%.

4. An alkali-free aluminoborosilicate glass according to claim 3, wherein the content of MgO is at least 3 weight %, based on oxide.

5. An alkali-free aluminoborosilicate glass according to claim 2, wherein the content of MgO is at least 3 weight %, based on oxide.

6. A process for producing a glass according to claim 2, comprising the process steps of batch preparation, melting, refining, homogenizing, hot shaping, characterized in that 0.2–3% by weight of $NH_4NO_3$ are added to the batch.

7. A glass produced by the process of claim 6.

8. Aluminoborosilicate glass according to claim 1, characterized by the following composition (in % by weight, based on oxide):

| | |
|---|---|
| $SiO_2$ | 60.5–62.5 |
| $B_2O_3$ | 7.0–8.5 |
| $Al_2O_3$ | 15.5–19.5 |
| MgO | 3–5 |
| CaO | 2–5 |
| SrO | 3–7 |
| BaO | 0.6–1.5 |
| with MgO + CaO + SrO + BaO | 10–14 |
| ZrO2 | 0.2–0.6 |
| SnO2 | 0.2–0.6 |
| TiO2 | 0.2–0.4 |
| CeO2 | 0.01–0.5. |

9. An alkali-free aluminoborosilicate glass according to claim 8, wherein the $SiO_2$ weight percent, based on oxide, is over 60.5% to 65%.

10. An alkali-free aluminoborosilicate glass according to claim 8, wherein the content of MgO is at least 3 weight %, based on oxide.

11. A process for producing a glass according to claim 8, comprising the process steps of batch preparation, melting, refining, homogenizing, hot shaping, characterized in that 0.2–3% by weight of $NH_4NO_3$ are added to the batch.

12. A glass produced by the process of claim 11.

13. Aluminoborosilicate glass according to claim 1, further comprising a positive amount of at least one of the following:

| | |
|---|---|
| $As_2O_3$ | 0–1.5 |
| $Sb_2O_3$ | 0–1.5 |
| $Cl^-$ | 0–1.5 |
| $F^-$ | 0–1.5 |
| $SO_4^{2-}$ | 0–1.5 | with $As_2O_3+Sb_2O_3+Cl^-+F^-+SO_4^{2-}$ 1.5.

14. Aluminoborosilicate glass according to claim 1 produced in a float plant, characterized in that the glass is essentially free of arsenic oxide, antimony oxide, lead oxide, cadmium oxide, zinc oxide, bismuth oxide, niobium oxide, tantalum oxide and phosphorus oxide.

15. A process for producing a glass according to claim 14, comprising the process steps of batch preparation, melting, refining, homogenizing, hot shaping, characterized in that 0.2–3% by weight of $NH_4NO_3$ are added to the batch.

16. A glass produced by the process of claim 15.

17. An alkali-free aluminoborosilicate glass according to claim 1, wherein the $SiO_2$ weight percent, based on oxide, is over 60.5% to 65%.

18. An alkali-free aluminoborosilicate glass according to claim 17, wherein the content of MgO is at least 3 weight %, based on oxide.

19. An alkali-free aluminoborosilicate glass according to claim 1, wherein the content of MgO is at least 3 weight %, based on oxide.

20. Aluminoborosilicate glass according to claim 1, which has a coefficient of thermal expansion $\alpha_{20/300}$ if between 3.0 and $3.8\times10^{-6}$/K, a temperature at a viscosity of $10^{14.5}$ dPas of at least 680° C., a temperature at a viscosity of $10^4$ dPas of between 1270° C. and 1350° C., a transformation temperature Tg of between 710° C. and 780° C., a density p of at most 2.50 g/cm$^3$ and a weight loss of at most 1.0 mg/cm$^2$ after treatment in 5% strength hydrochloric acid at 95° C. for 24 hours.

21. A process for producing a glass according to claim 20, comprising the process steps of batch preparation, melting, refining, homogenizing, hot shaping, characterized in that 0.2–3% by weight of $NH_4NO_3$ are added to the batch.

22. A glass produced by the process of claim 21.

23. A process for producing a glass according to claim 1, comprising the process steps of batch preparation, melting, refining, homogenizing, hot shaping, wherein 0.2–3% by weight of $NH_4NO_3$ is added to the batch.

24. A glass produced by the process of claim 23.

25. A display comprising as a substrate an aluminoborosilicate glass according to claim 1.

26. A display according to claim 25, wherein said display is a thin film transistor display.

27. A thin-film photovoltaic comprising as a substrate an aluminoborosilicate glass according to claim 1.

* * * * *

UNITED STATES PATENT AND TRADEMARK OFFICE
CERTIFICATE OF CORRECTION

| | | |
|---|---|---|
| PATENT NO. | : 6,465,381 B1 | Page 1 of 1 |
| DATED | : October 15, 2002 | |
| INVENTOR(S) | : Lautenschlager et al. | |

It is certified that error appears in the above-identified patent and that said Letters Patent is hereby corrected as shown below:

<u>Column 14,</u>
Line 10, after "$SO_4^{2-}$", insert -- $\leq$ --.

Signed and Sealed this

Nineteenth Day of August, 2003

JAMES E. ROGAN
*Director of the United States Patent and Trademark Office*